June 21, 1938.  J. V. MARTIN  2,121,504
VEHICLE SUSPENSION
Original Filed July 21, 1931    11 Sheets-Sheet 4
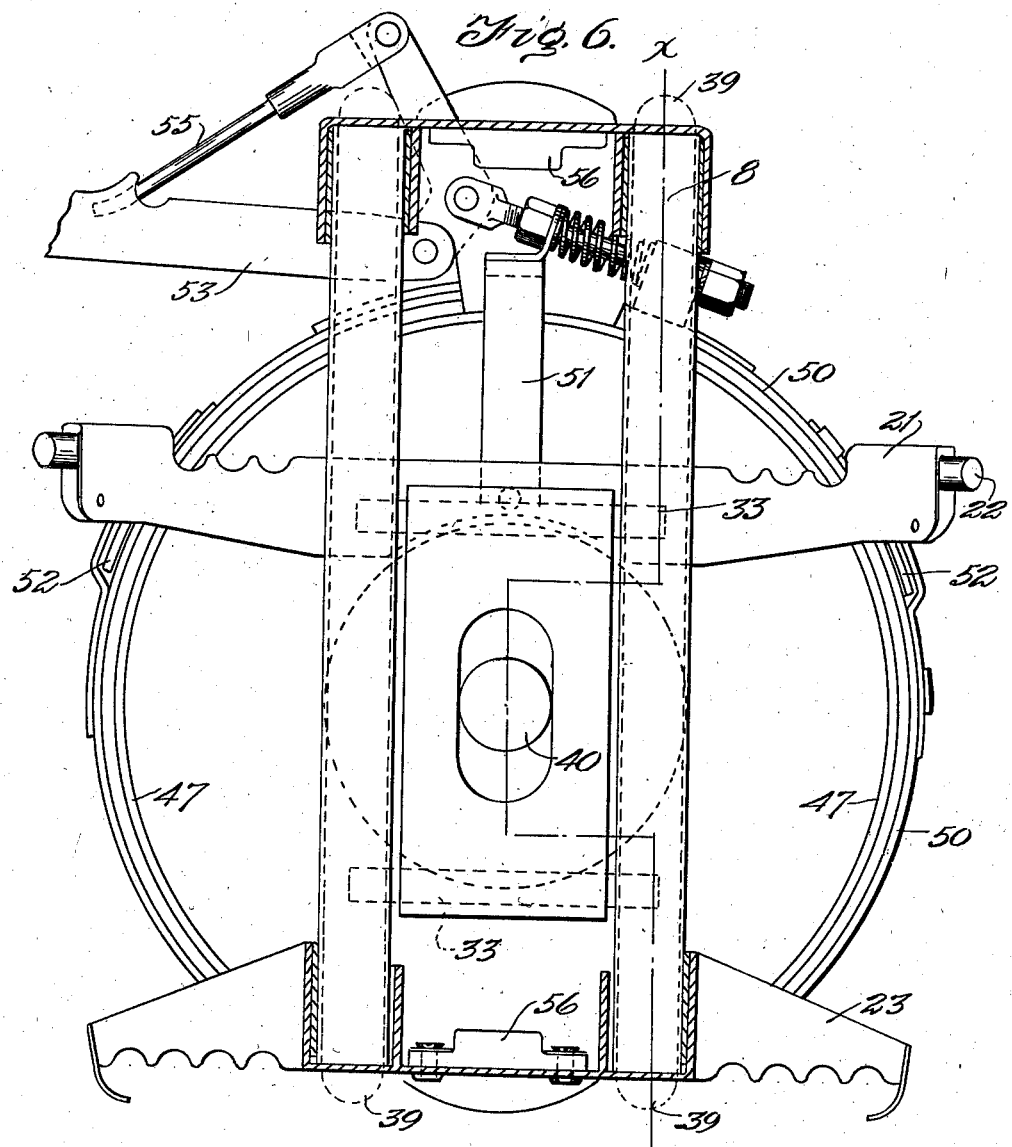
Inventor
James V. Martin
By Jas. V. Martin
Attorney

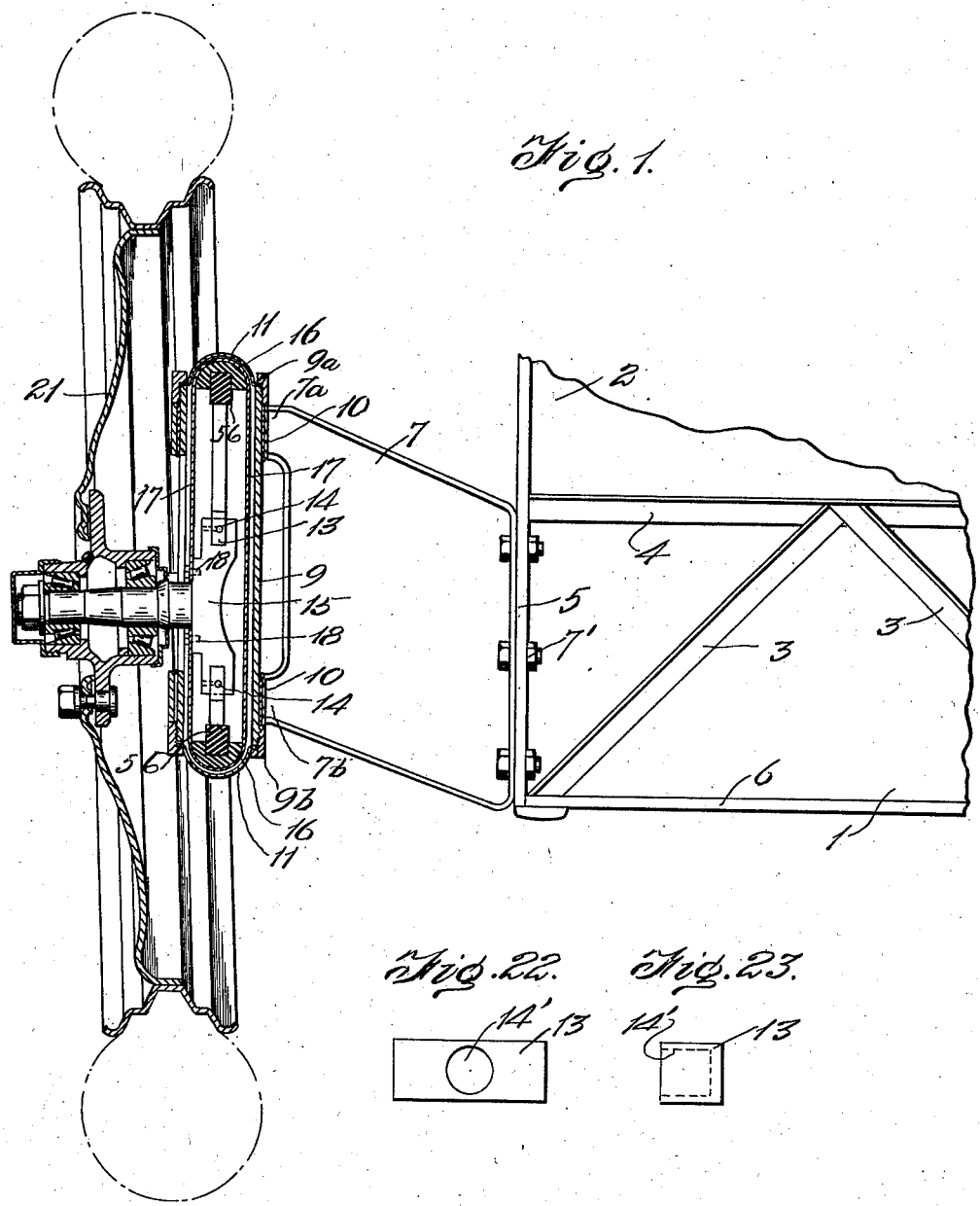

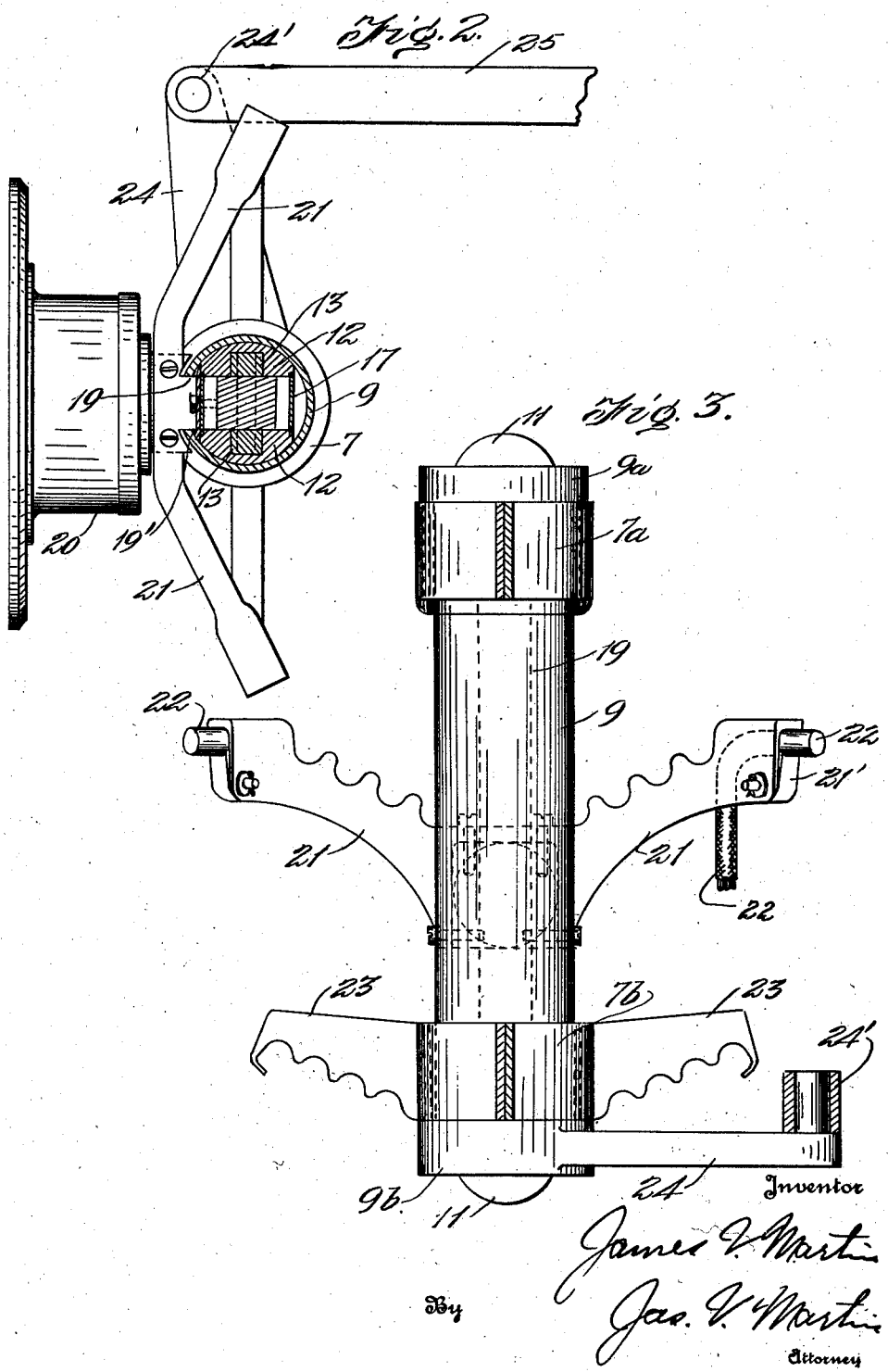

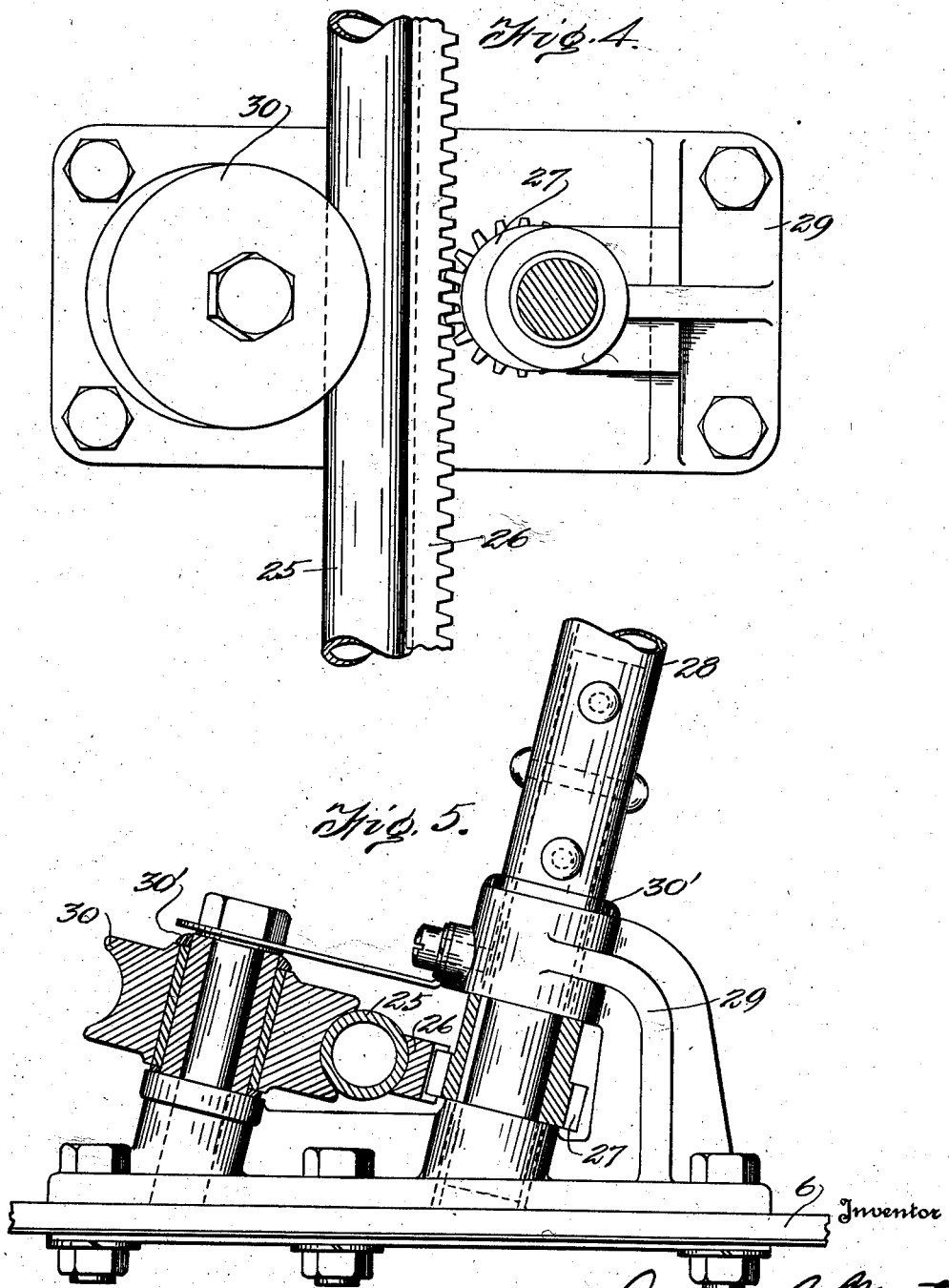

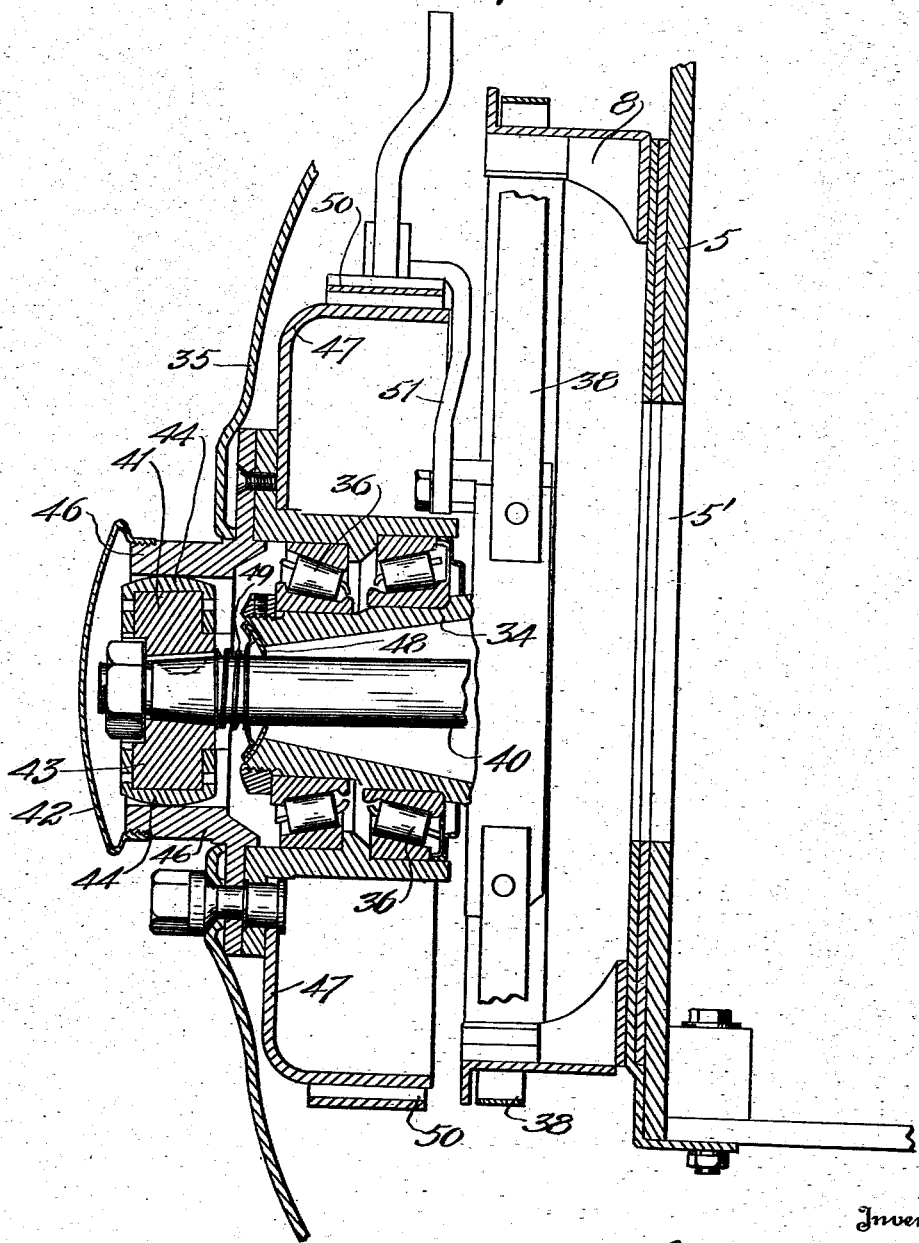

June 21, 1938.  J. V. MARTIN  2,121,504
VEHICLE SUSPENSION
Original Filed July 21, 1931  11 Sheets-Sheet 6
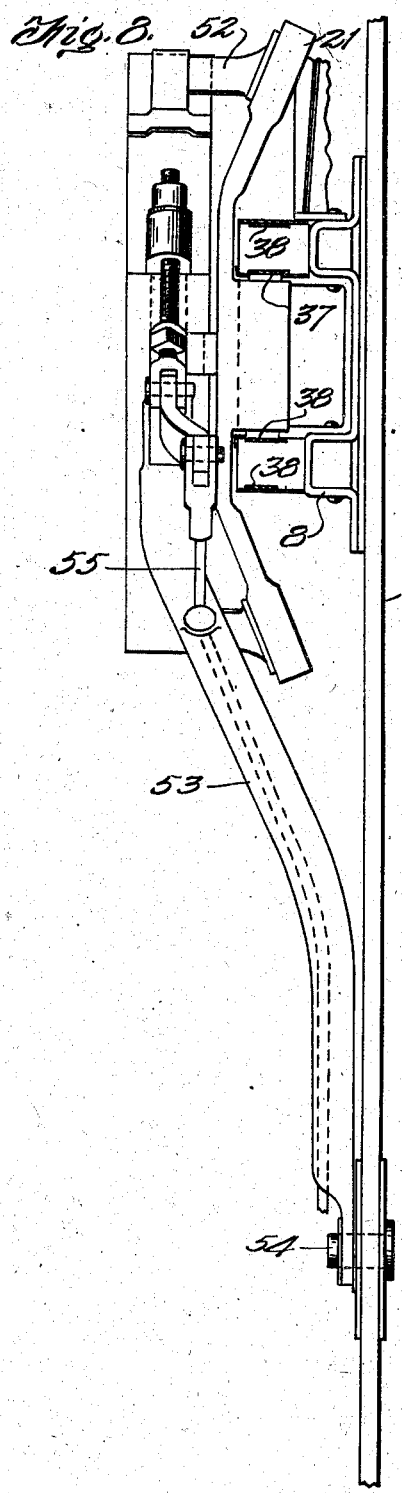
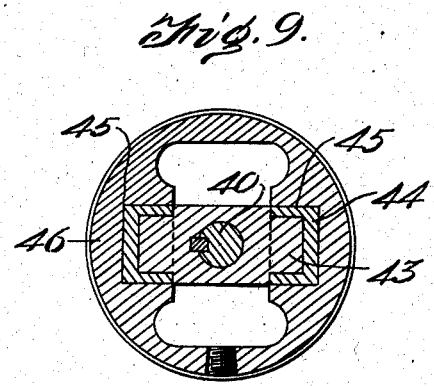
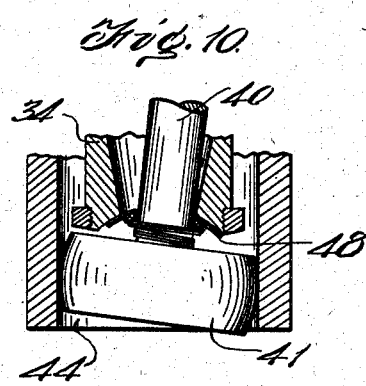
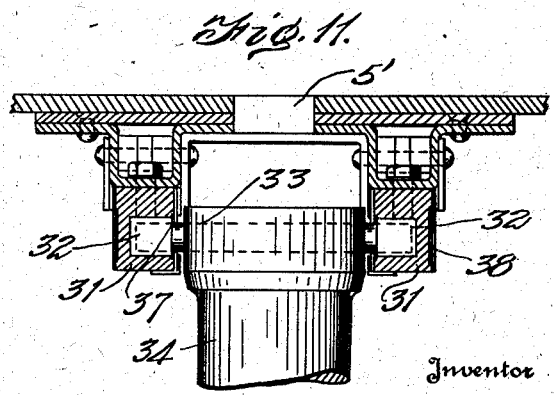
Inventor
James V. Martin
By Jas. V. Martin
Attorney June 21, 1938.  J. V. MARTIN  2,121,504
VEHICLE SUSPENSION
Original Filed July 21, 1931  11 Sheets-Sheet 7
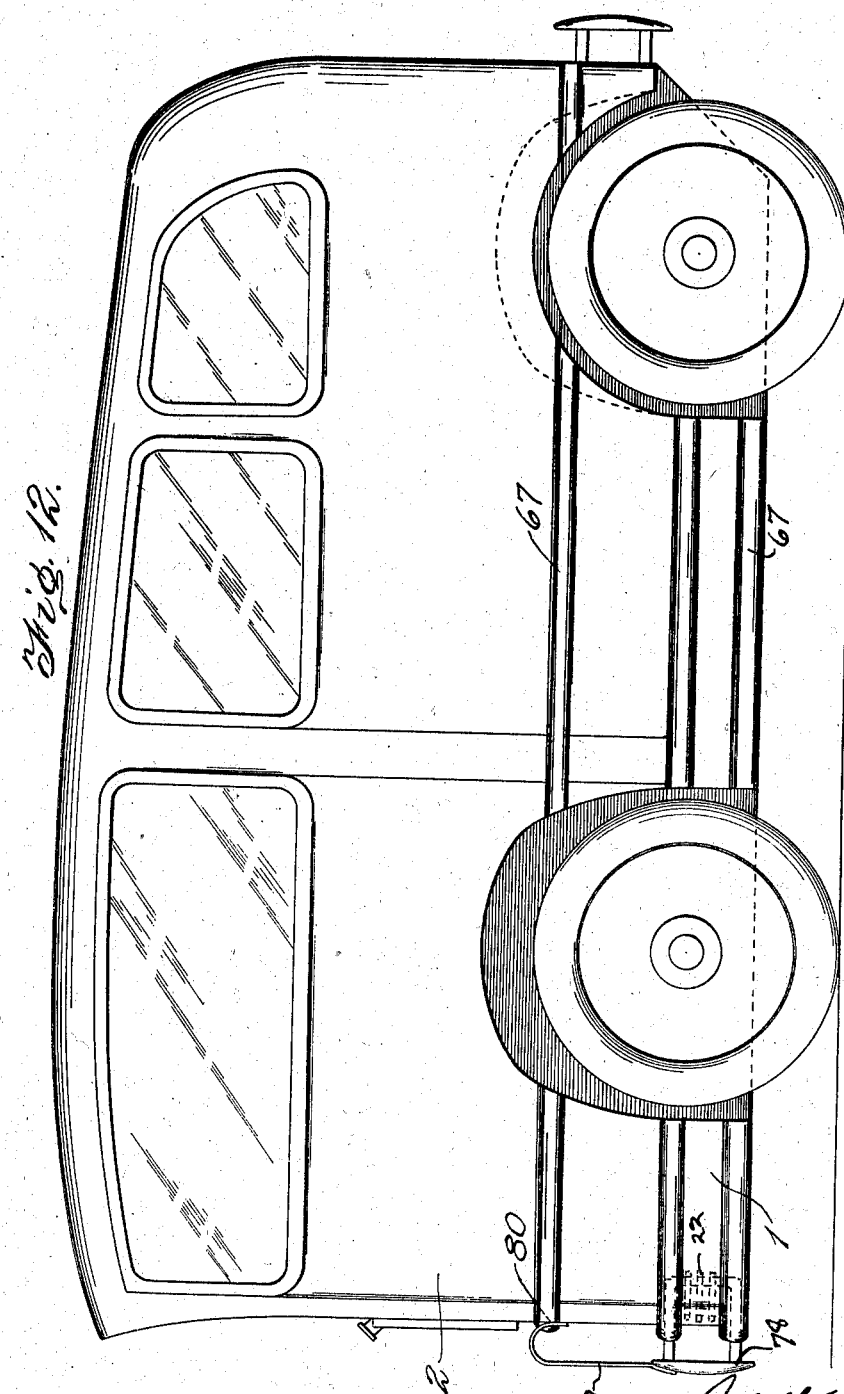

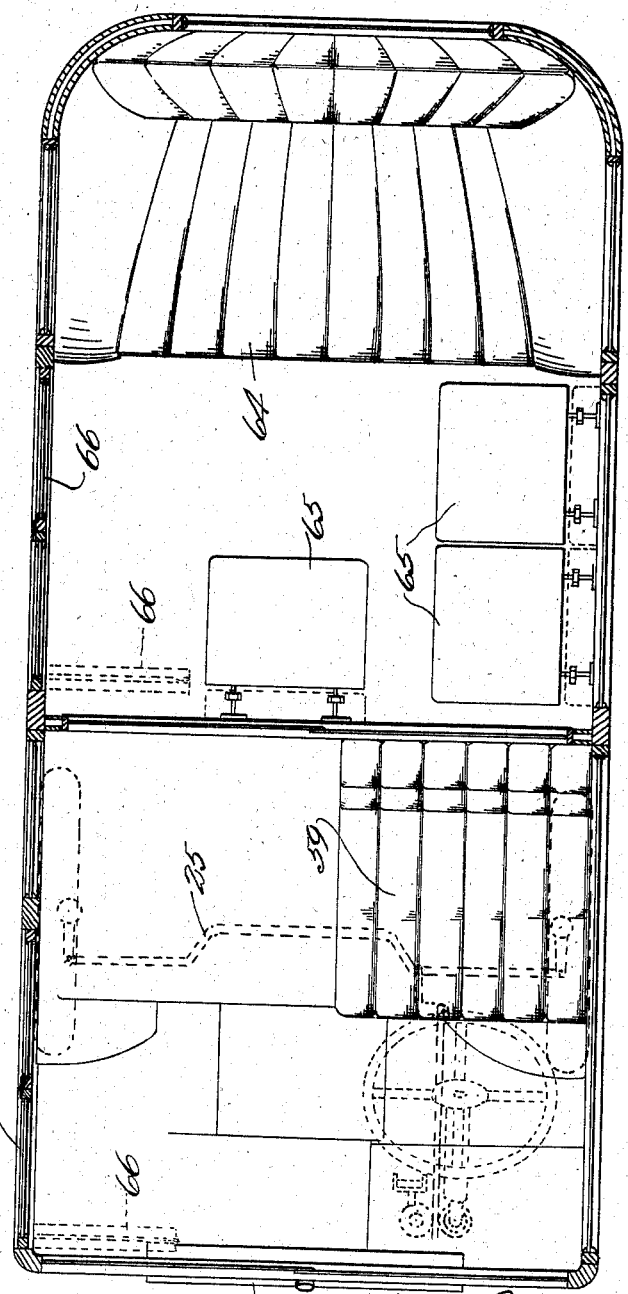

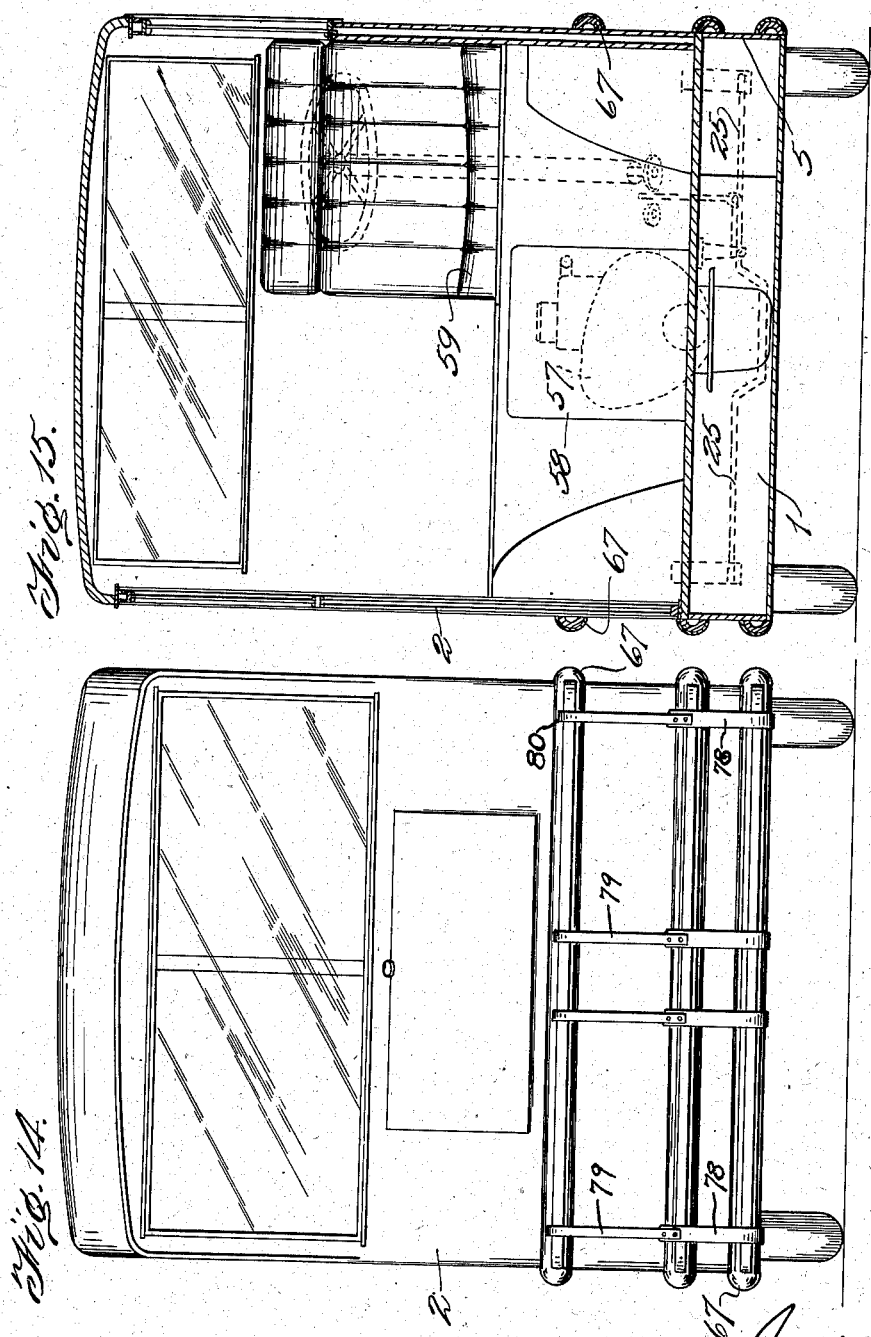

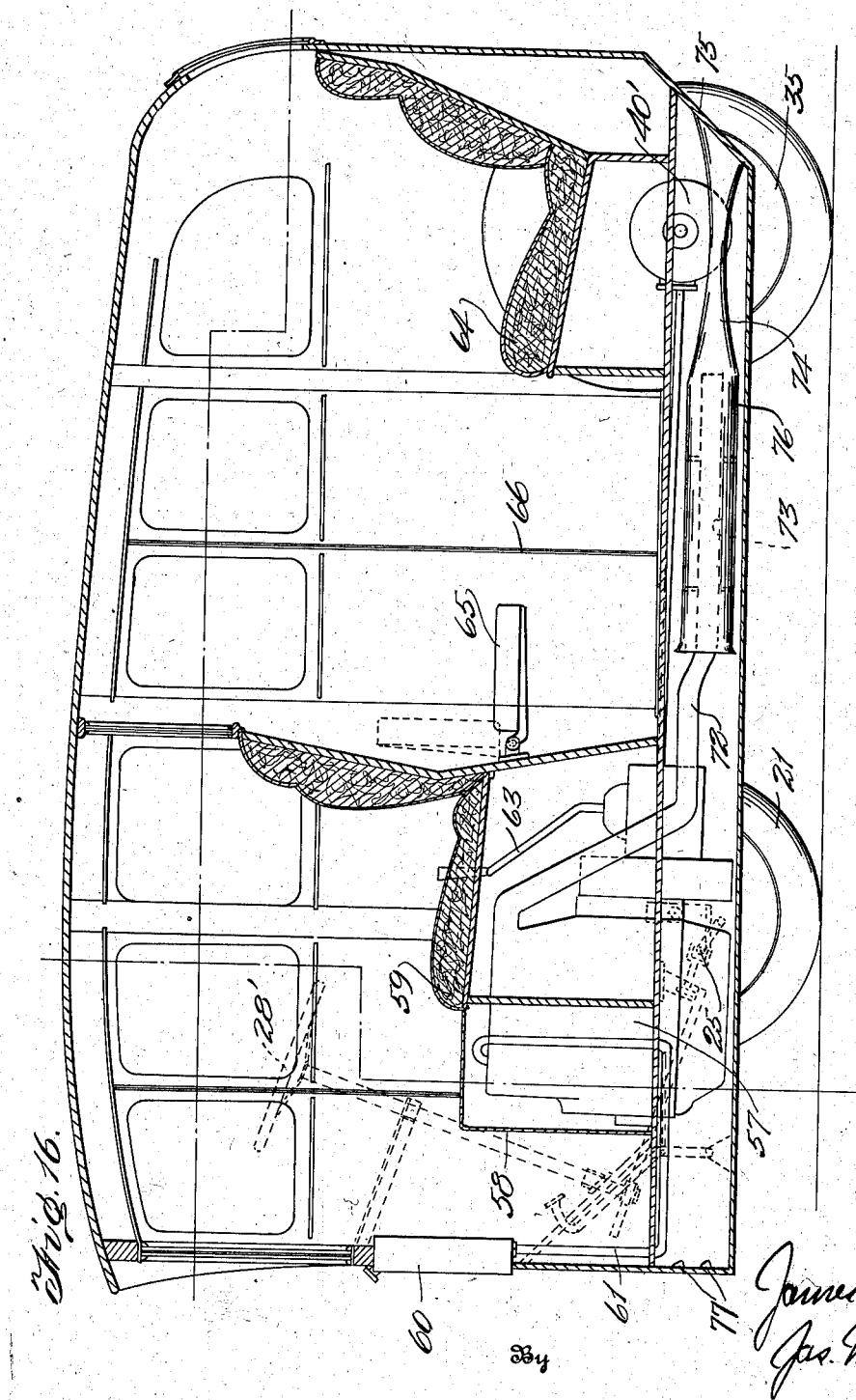

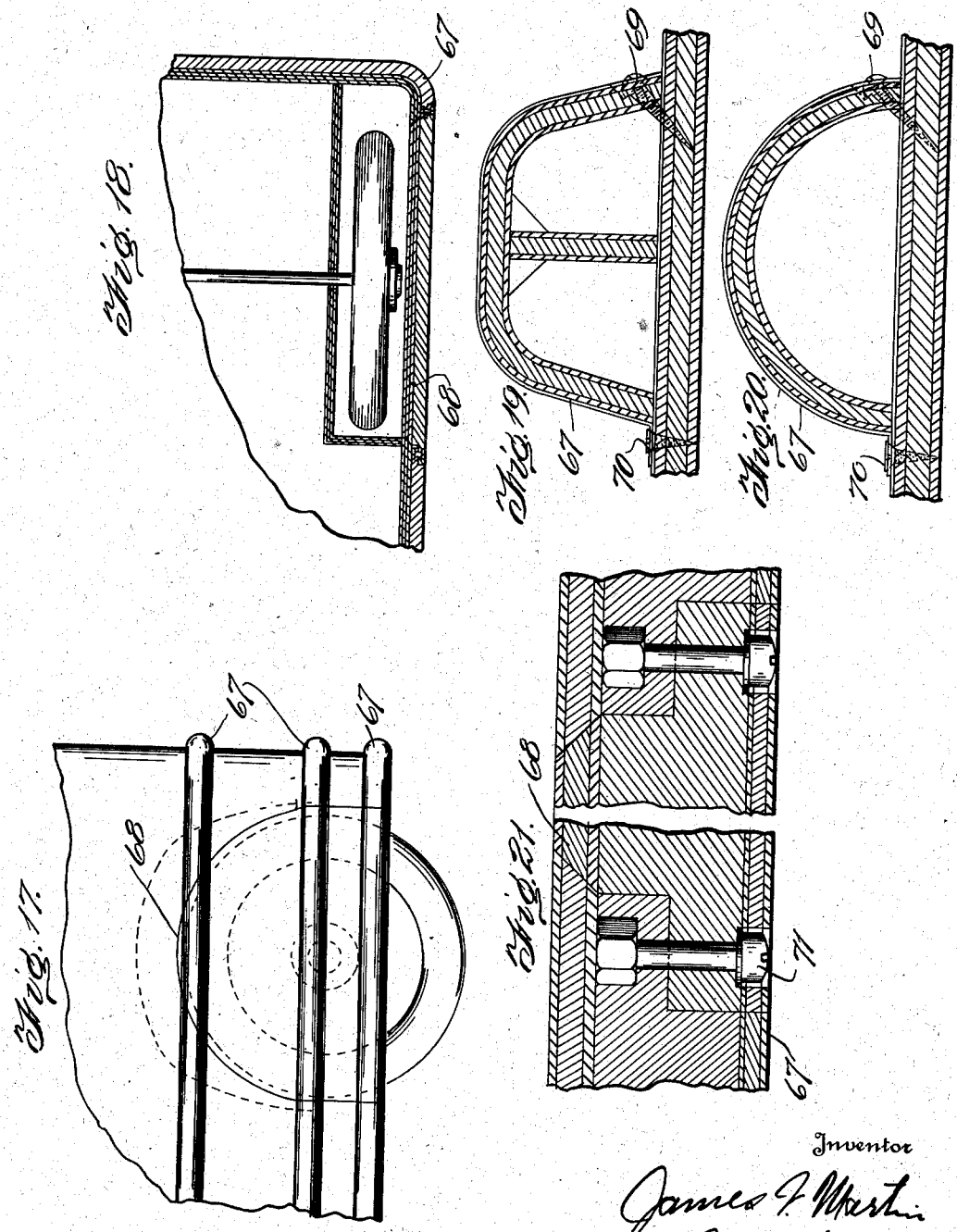

Patented June 21, 1938

2,121,504

UNITED STATES PATENT OFFICE 2,121,504

VEHICLE SUSPENSION

James V. Martin, Garden City, N. Y.

Application July 21, 1931, Serial No. 552,238
Renewed June 19, 1937

17 Claims. (Cl. 280—124)

The primary object of my invention is to provide an improved vehicle suspension, which while holding the wheels inflexibly within a rotational plane or planes will permit a large range of comparatively free vertical movement, i. e. yieldable vertical movement free from cramping or binding effects due to various side loadings of the wheels.

The benefits of individual springing for vehicle wheels have long been known, but practical difficulties have prevented success in application and in my experience the tendency of vertical guides to cramp or bind has held back the application of complete individual wheel springing.

A further object of my invention is to simplify and adapt the related steering and driving parts in harmony with the new form of guide herein disclosed and to improve upon the guide brackets and steering means shown in my co-pending Serials #355,839, filed Apr. 17, 1929 and issued as Patent #2,010,368; #407,131 filed Nov. 14, 1929 and issued as Patent #2,084,694 and #431,617 filed Feb. 26, 1930 and issued as Patent #1,989,995.

A still further object of my invention is to show the best application of my invention to a road vehicle and an aeroplane and to provide a more compact arrangement of seating, motor placement, wheel location and entrance than those hitherto known or used and to eliminate from external positions certain parts such as the muffler and to protect in a novel manner the sides of the vehicle from injury due to contact with other objects.

Still further objects of my invention will become apparent as the description proceeds.

Fig. 1 is a view in elevation and mostly in section showing my improved guide and bracket as applied to the front left steering wheel.

Fig. 2 is a view looking down upon the guide and associated hub and tie rod parts, the guide parts themselves being in section.

Fig. 3 is an elevational view looking at the guide from the position of the guide bracket attachment to the vehicle body.

Fig. 4 is a view looking downwardly upon the steering bracket at the base of the steering column, and Fig. 5 is a view in side elevation of this same bracket.

Fig. 6 is a view in elevation and partly in section of the rear left wheel guide bracket and braking mechanism, and Fig. 7 is an elevation, mostly in section, taken along the line X—X of Fig. 6.

Fig. 8 is a view looking down upon the rear drive wheel guide bracket and brake mechanism, and Fig. 9 is a sectional view through the universal joint shown in the hub cap of Fig. 7, and Fig. 10 is a still more detailed internal view of this universal joint turned to a maximum angle.

Fig. 11 is a sectional view looking down upon the center of the rear guide bracket.

Fig. 12 is a side elevation showing the outside of an improved taxibus or cab to which my invention is applied, and Fig. 13 is a plan view showing the inside seating and door arrangements of the improved taxibus, while Fig. 14 is a front elevation and Fig. 15 a front interior view of the said taxi and, Fig. 16 is a side elevational view showing the interior partly in section, and Fig. 17 shows the preferred arrangement of my novel guard strips and pannel inclosing the rear drive wheel, and Fig. 18 shows the wheel housing and pannel in section as seen from above and Fig. 19 shows one form of the guard strip in section while Fig. 20 shows an alternative form and alternative methods of attaching to the body side wall, while Fig. 21 shows a method of marrying the ends of the guard strips and their pannel to the car side wall to bridge the strength against external blows.

Fig. 22 shows the self-aligning guide shoe and Fig. 23 is an end view of the same showing in dotted lines the hole for the self-aligning axis.

Continuing with a more detailed description of my invention similar numerals will designate similar parts throughout:

I indicates a box-like trussed lower portion of a vehicle designed to be associated with my new type of suspension and having an angle iron bridge truss 3 cooperating with a floor support 4 and a side wall 5 and bottom 6 to form a nonflexing support for the guide wheel brackets 7 and 8, which are bolted to the side wall at 7', Fig. 1.

The front wheel brackets 7 have an upper fork 7a and a lower fork 7b which hold a steel tube 9 turnable in bushings 10. Threaded rings 9a at top and 9b at bottom hold the tube from vertical movement in the forked bracket and also hold in place a steel metal closing cap 11 at top and bottom of the ends of the said tube.

Inside of tube 9 and welded or screwed thereto are milled forms 12 (Fig. 2) having square shaped vertical slots into which shoes 13 fit snugly.

Pins 14 attached to the spindle forging 15 allow the shoes 13 to turn freely in the holes 14' in the center of each shoe, so that all lateral pressures transmitted to the spindle forging 15 will distribute their pressure evenly all along one face of each shoe and in no case can the upper or lower edge of a shoe tend to dig into or pinch the guide surface. For simplicity the tube 9 including its relatively slidable parts may be referred to as a self-aligning guide: Figs. 1, 13 and 15 show one such guide between each steering wheel and the body bracket.

It will be observed that there are four shoes widely separated to give leverage strength to the spindle forging and to hold the wheel in desired planes of rotation while allowing it to travel freely vertically in the guide grooves. 16 indicates a radiused head at top and bottom of the milled forms 12 and this is grooved or recessed so that it provides a guide and radiused part for the slipping of a steel ribbon 17 which is attached to the steel forging at 18. It will be noticed that the spindle forging enters the tube 9 through a slot 19 vertically elongated as shown by dotted lines in Fig. 3 and the function of the steel ribbon is to seal the slot against exit of grease and against ingress of dirt, packing is indicated at 19'. The wheel hub 20 is held on roller bearings on the steel spindle forging in conventional manner, while 20' indicates a disc wheel bolted to the said hub. Arms 21 are carried by the spindle forging and these have a three sided channel with the open side thereof closed by excentrically journalled and roughened clamps 21' designed to grip and hold aviator cord 22 such as more fully disclosed in my copending application Serial No. 355,839 filed April 17, 1929.

The lower fork 7b of the bracket 7 carries corresponding arms 23 and the rubber cords yieldingly suspend the vehicle body for vertical movement between these arms.

The tube 9 is fixed at its lower part to a steering arm 24 and each end of a steering tie rod 25 is journalled to turn about a bearing 24' of arm 24. This tie-rod does not move up and down with the wheels as in conventional practice but passes through a hole in the body above the bottom thereof and as disclosed in Figs. 4 and 5 has a rack 26 attached to it which is in mesh with a pinion 27 keyed to the lower end of the steering column 28 which is journalled to turn within a bracket 29 which is bolted to the body bottom 6. This bracket also carries an idler wheel 30 to hold the tie-rod in proper contact with the pinion 27. Dust caps 30' hold oil in and keep dust out.

Referring now to Figs. 6, 7, 8, 9, 10 and 11 the rear brackets 8 are somewhat like the front brackets excepting that they have no parts for steering, but have two guides or guide assemblies 31 spaced further apart and their shoes 32 held turnably on the ends of pins 33 and these pins are carried by the stub axle part 34 which holds the rear drive wheel 35 in rotational alignment by means of roller bearings 36. The shoes themselves are like 13 of Figs. 22 and 23 and are self-aligning as to pressures transmitted to the guide surfaces of 31. These guide surfaces are firmly held in body brackets 8 attached to wall 5 and like the front brackets the slots 37 are closed by steel ribbons 38 similar to those on the front brackets. These ribbons close the slots 37 against dirt and pass over radiused parts 39 indicated in dotted lines in Fig. 6.

A drive shaft 40 passes from the differential 40' which is fixed to the center of the lower portion 1 of the body; the shaft being attached by a universal joint, through a slot 5' in the body side wall 5 thence through the tapered hollow stub axle 34 to another universal joint 41 located within the hubcap 42. This universal joint is shown more particularly in Figs. 7, 9 and 10. Keyed to the shaft 40 is a cross-head 43 journalled to turn within bronze blocks 44 and these blocks are radiused to slide and rock within a square shaped portion 45 of the hub part 46 to which the wheel 35 is bolted and which also carries the brake drum 47. It will be noticed that the inner end of the stub-axle 34 is closed against exit of grease by a radiused dust cap 48 held tight by a spring 49 so that the grease placed within the hub cap 42 will suffice for both the universal joint and roller bearings.

The brake band 50 is carried by the upward arm 51 leading from the top of the stub axle part 34, this also carries the weight of the brake operating mechanism, while the brake band is guided on the drum 47 by clips 52 carried by the arms 21 which is also carried by the stub axle 34. Corresponding arms 23 are fixed to the lower end of the bracket 8 and carry the rear of the body through rubber cords 22 such as disclosed in relation with the front bracket. The brake operating mechanism is not much different from the conventional, but the brake torque is taken in an entirely novel manner, i. e. instead of passing this into a rear drive housing it is taken directly into the body side wall in sheer by a radius arm 53 journalled to the body 5 at 54. The operating cable 55 passes over the journal center 54 so that the operation of the brakes will not be affected by the vertical position of the stub axle in the bracket. Rubber bumpers 56 limit the relative movement of the guide travel and stresses are taken simply and directly instead of in the complicated and multiplied fashion of conventional practice.

Referring now to Figs. 12, 13, 14, 15 and 16 we find a motor 57 bolted securely to the base 1 of the taxi and inclosed within a housing 58 located under and to one side of the driver's seat 59. A radiator 60 has a water connection 61 with the motor through the double bottom base 1 of the taxi and a hand wheel 28' is mounted upon the top of the steering column. A gear box 62 is reached by hand lever 63, while differential 40' is located under the rear seat 64 and additional folding seats 65 are provided. The doors 66 operate by rods, not shown, in a well known manner from the driver's seat and fold into the dotted line positions shown in Fig. 13. In this particular arrangement of driver and steering column a link connection is shown to reach from the column end back to the steering tie rod, but it will be understood that where the driver does not sit so far forward the direct connection of tie rod and column shown in Figs. 4 and 5 may be used; in any case the tie rod is above the body bottom and thus protected from injury and road stresses.

Guard strips 67 pass entirely around the vehicle body, in the preferred construction continuing on a pannel outside of the rear wheel. The pannel 68, Figs. 17 and 18 provides a means of readily approaching the rear wheel to remove the same and the guard strips bridge the strength across the pannel by the particular union they have with the adjoining guard strips as shown in Fig. 21.

As shown in Figs. 19 and 20 these guard strips are built up in form and material for great strength and are hollow for light weight, being of combined wood and metal construction glued together with water resisting glue. Alternative methods of attaching the guard strips to the side wall are shown at 69 and 70 and where an outwardly swinging door is used it is contemplated carrying the guard strip across the door having a V shape at the hinge side and a shape such as shown at Fig. 21 omitting the bolt 71 on the non-hinge side. In order to prevent the horizontal protrusions of other vehicles from injuring the body of a vehicle I have provided vertically disposed guard bumpers 78 and 79 outwardly of the horizontal guard bumpers 67, see Figs. 12 and 14. It will be noticed that vertical part 79 is attached at 80 to the horizontal bumper 67. Such a door may replace the closed side of the taxi-bus omitting the two folding seats.

Since the low center of gravity obtained by my boxlike structure is so near to the ground that no room for a muffler is available a new type of muffler suitable for installation inside of the base 1 is provided at 73 which takes the exhaust gases from pipe 72 and by Venturi tube effect 74 the air circulation through the base 1 from the air openings 77 and drawn around the muffler 73 through the outer muffler cover 76 is increased and the hot gas expelled at 75. 78 shows my improved vehicle bumper using rubber cords 22.

Having thus disclosed the nature of my invention and its method of operation, what I specifically claim is:—

1. In combination with a vehicle body and road wheel, an intervening guide bracket inclosing self-aligning guide surfaces to hold the wheel in desired relations with the said body and providing a sliding yieldable vertical movement therebetween, a steering tie-rod leading from a sprung portion of the said bracket through the body side wall above the body bottom, a steering column secured to the body bottom and carrying a pinion thereon, and a rack meshing with the said pinion on the said tie rod to move the same.

2. In combination with a wheel bracket intervening between a vehicle side wall and a road wheel, a stub axle part vertically elongated and guided for vertical movement within an inclosed part of the said bracket and carrying the wheel spindle through a slot in the said bracket and a steel ribbon having one end attached to the said part above and the other end below the said spindle and closing the said slot against ingress of dirt.

3. In combination with independent wheel springing for a vehicle, an internally trussed portion of the vehicle body extending horizontally between two forward steering road wheels, the floor of the said body forming the upper member of the said trussed portion and a lower bottom closure forming the bottom truss member, a forked wheel guide bracket having an upper fork leading off from the upper and a lower fork from the lower of said truss limits on each side of the said body, a vertically yieldable stub axle member sliding on self aligning bearings within a cylindrical guide, the said guide journalled to turn within bearings located in the said forked bracket, a tie rod lever rigid with the cylindrical guide on each side and a connecting rack passing through the said trussed body portion and connecting the said tie rod levers, a steering column passing through a bearing located within the said trussed portion and a pinion meshing with the said rack and rotated by the said column to steer the said wheels.

4. In combination with independent springing for the drive wheel of a vehicle, a stub axle part holding the rotational alignment of the said wheel through anti-friction bearings and having guide extensions on the body side of the said bearings, multiple guide shoes journalled to the said extensions and sliding vertically in an inclosed guide rigid with the lower part of the said body.

5. A combination according to claim 4 and a drive shaft passing through the said stub axle part to a universal joint located outwardly of the said bearings.

6. In combination with independent drive wheel springing for road vehicles, two vertically elongated and spaced apart guide members attached to the sprung portions of the said vehicle, each of said guide members inclosing an upper and a lower shoe, each said shoe carried on a pivot by a stub axle part of the said wheel and the said pivot located intermediate the upper and lower bearing surfaces of each said shoe.

7. A combination according to claim 6, an entrance in each said guide member for portions of said axle part and a loop of flexible material sealing one of the said entrances against ingress of dirt while permitting vertical movement of the said part therein.

8. In combination with the independently sprung drive wheel of a vehicle, a stub axle part holding the rotational alignment of the said wheel through anti-friction bearings and having guide extensions on the body side of the said bearings, multiple guide shoes journalled to said extensions and sliding vertically in an inclosed guide rigid with the lower part of the said body, a drive shaft passing through the said stub axle to a universal joint located outwardly of the said bearings and means to seal the space between the outer end of the said stub axle and the shaft against passage of oil or dirt while permitting universal movement of the said shaft.

9. The combination between a vehicle having a bracket and ground wheel, of a vertically elongated guide secured at its top and bottom to the said bracket, a stub axle part for the said wheel extending from the said wheel into the said guide between the secured portions thereof and having upwardly and downwardly extending parts within the said guide and a pivoted shoe on each of the said extending parts.

10. In combination with an individually sprung vehicle wheel, a guide, a stub axle part guided for vertical movement within the said guide and entering the said guide through a slot in the wheel side thereof and a flexible closure for the said slot sealing the sides thereof attached to the upper and lower side of the said stub axle part.

11. In combination with a vehicle and one of its ground wheels, a vertical guide, a stub axle part, guide shoes carried by said part and sliding within the said guide and holding the said vehicle and wheel in guided vertical alignment with each other, the said shoes pivotally mounted on the said part so that they have part of their bearing surfaces above and part below the said pivot.

12. In combination with a vertical guide bracket intervening between and connected to a vehicle and one of its ground wheels, an inclosed vertical guide, a stub axle part connected to the said bracket and having pins thereon multiple sliding shoes journalled on said pins carried by the said part and fitted within the said guide and parts of the bearing area of each said shoe located above and other parts below the said pins.

13. In combination with guide brackets intervening between a vehicle side wall and a road wheel thereof, a radius rod, a stub axle part, shoes journalled on pins attached to the said part and holding it in a given rotational plane relative the said vehicle and wheel while permitting vertical movement there-between and the said rod arranged to absorb brake torque so that such torque does not enter the said shoes.

14. In combination with independently sprung wheels for a vehicle, an internally trussed portion of the vehicle body extending horizontally between two forward steering wheels, the floor of the said body forming the upper member of the said trussed portion and a lower bottom closure forming the bottom truss member, a forked bracket having an upper fork leading off from the said upper and a lower fork from the said lower member of the said truss limits on each side of the said body, a stub axle part sliding vertically on self-aligning bearings within a cylindrical guide journalled to turn within the ends of the said forks.

15. In combination with independent wheel springing for a vehicle wheel, a vertical guide attached to the sprung part of the said vehicle, a stub axle part entering through a slot in the side of the said guide and a continuous loop of flexible material passing from the upper said axle part where it enters the said slot and sealing the said slot against ingress of dirt and passing over radiused portions of the said guide at top and bottom thereof and ending adjacent the bottom of the said axle part where same enters the said slot.

16. In combination with a vehicle wheel, a stub axle part, a vertical wheel guide carried by the vehicle and guide shoes pivotally carried by the said stub axle part, the axis of the said pivots being intermediate part of the upper and lower area of the said shoes.

17. A combination according to claim 16 and a means including rubber in tension to carry the said guide yieldably from the said axle part.

JAMES V. MARTIN.